Patented July 15, 1952

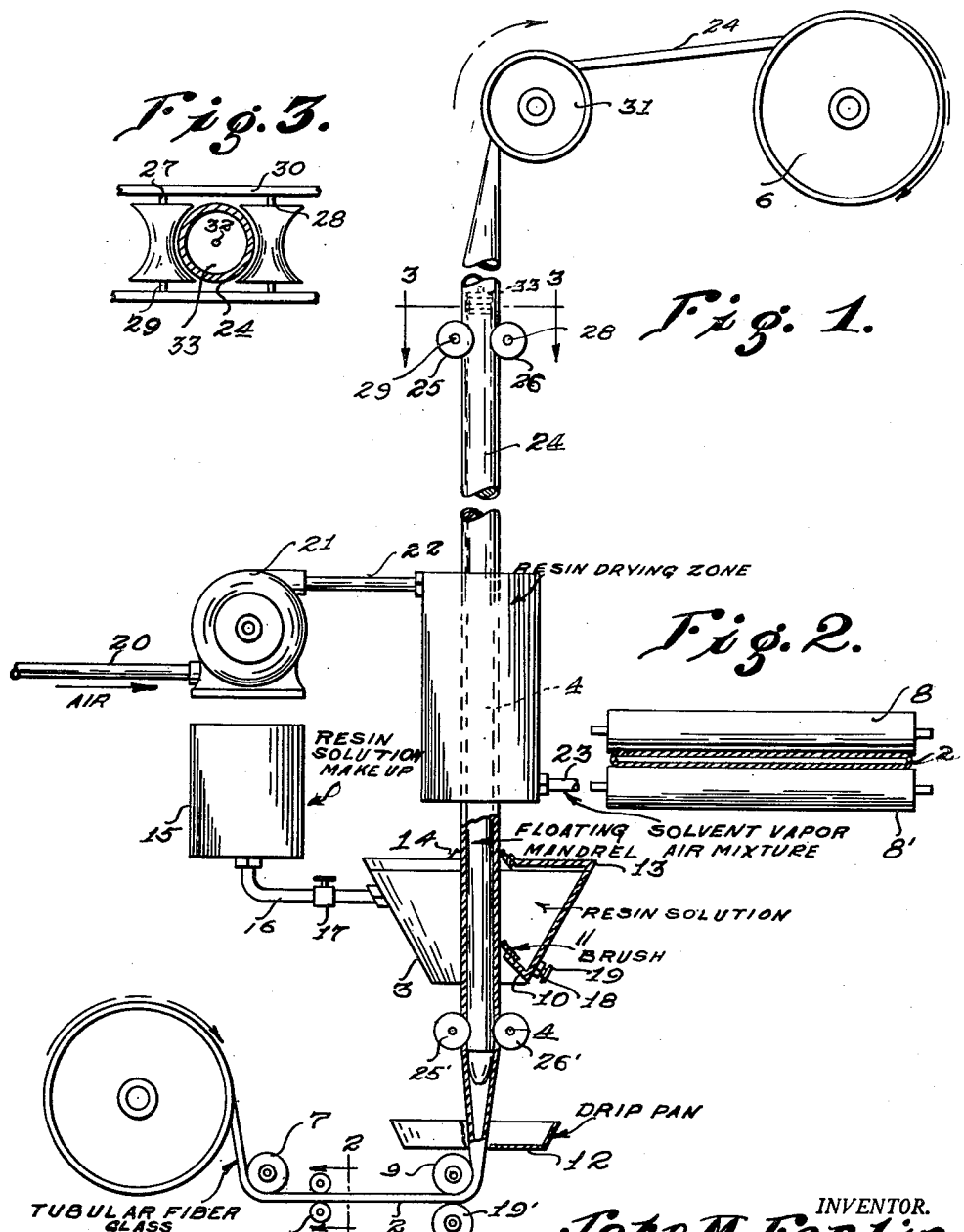

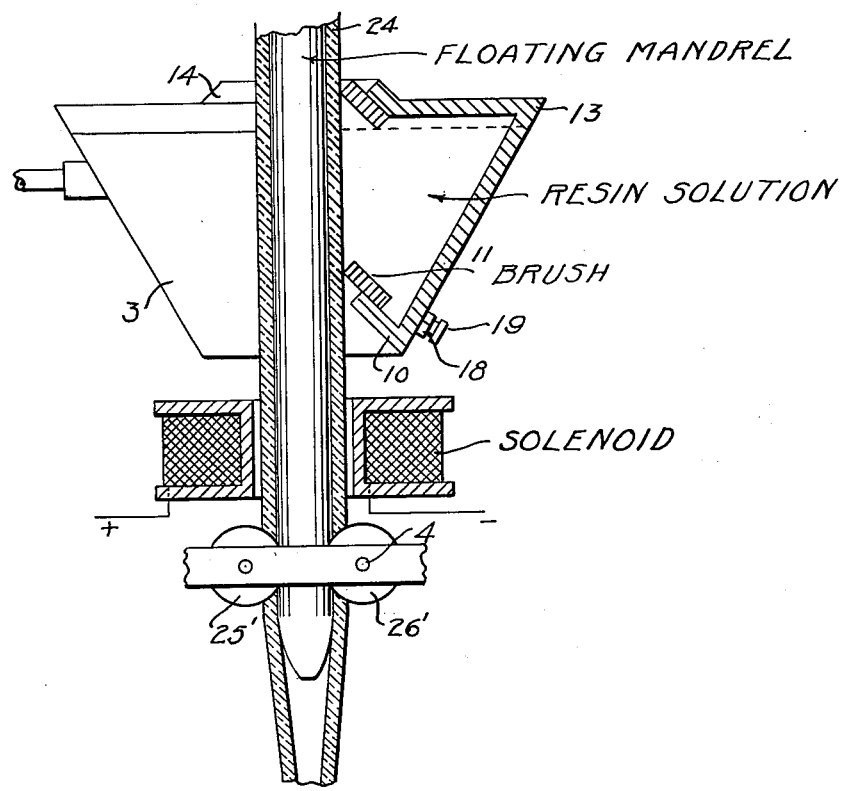

2,602,959

UNITED STATES PATENT OFFICE 2,602,959

APPARATUS FOR MAKING TUBULAR CONDUITS

John M. Fenlin, Beverly, N. J.

Application March 5, 1948, Serial No. 13,240

6 Claims. (Cl. 18—12)

This invention relates to improved tubular conduits, more particularly to fluid-carrying conduits of an improved, composite filamentary and plastic construction.

As is well known, there is high continuous demand, both in the domestic and technical fields, for flexible tubular conduits for transporting fluids. A typical example of such conduits is the rubber hose or equivalent flexible tubing used, for example, in domestic water installations, garden hose, and the like. Since garden hose may be considered as generally characteristic of such flexible tubing, the present invention will be described with reference to the production of such hose, it being understood that the improved characteristics of the novel type of hose inherently adapt it to widely ramified domestic and technical uses.

The typical earlier type of garden hose, as is known, comprised essentially a relatively thick walled rubber tubing reinforced with netted or woven cotton fibers. This type of hose had many inherent disadvantages. Due to the relatively high density of the rubber, coupled with the high wall thickness which was inherently required to provide the necessary bursting strength, the weight of the hose per unit of length was inordinately high. Thus the standard fifty foot length of the old type of garden hose weighed of the order of 18 to 20 pounds. This excessive weight was of marked disadvantage inasmuch as it necessarily involved considerable physical strength to carry or even to drag hose units about the garden. This weight is a factor of considerable importance since the garden hose is used to a considerable extent by the housewife and younger children.

Another disadvantage of the older type of hose is its relative inflexibility. The early material could, of course, be flexed, but the hose was nevertheless relatively stiff and could be bent or convoluted only on a rather substantial radius of curvature. Thus when the hose was coiled for storage, considerable space was required, and when coiled on the typical cylindrical hose supports but relatively short lengths could be accommodated.

These disadvantages have been recognized in the past and many suggestions have been advanced to obviate them. Recently relatively thin walled hoses of rubber and plastics have been produced which are an improvement over the older type of hose. These products are considerably lighter per unit of length than the older type. For example, whereas, as noted, the standard length of fifty feet of rubber garden hose of the older type weighed about 18 to 20 pounds, recent hose fabricated from synthetic resins weighs only about 6 pounds for the same unit length. These newer products, however, inherently are low in tensile and bursting strength since no high tensile reinforcement is utilized in the fabrication.

It has now been found that hose or tubing may be produced economically which possesses the desirable characteristics, among others, of light weight, great flexibility, ultra high tensile strength and longevity in use. These characteristics, as will be seen more fully hereinafter, are of an order that was unattainable when utilizing earlier methods of fabrication.

Considered briefly, the present invention comprehends the concept of providing a tubular material of an exceptionally high tensile strength to weight factor and bonding to this a flexible, tough, chemically-resistant, water-impermeable plastic to thereby produce a relatively thin wall, light weight and ultra high strength hose. The hose or tubing produced according to the invention, as will be seen later, comprises essentially a preformed tubular core of woven or otherwise interlocked high strength filaments, preferably of fiber glass encased with a flexible, tough and durable plastic material. The plastic material thus serves as the water or other fluid-impermeable medium and also protects the fiber glass from abrasion. Preferably the fiber glass filaments are of a low denier, as, for example, between about 40 to 100 microns in diameter to thus give the ultra high tensile strength characteristic of these fine filaments. The tubing preferably is woven relatively closely, but obviously may be made by knitting, netting or any other method of interlocking the fibers. Inasmuch as the fiber glass is in the form of tubing, it will be appreciated that the fluid pressure in the hose is taken up substantially as a tensile stress in the fiber glass filaments. As is known, the fine denier fiber glass filaments have an ultra high tensile strength of from 100,000 to 200,000 p. s. i. When tubing is made up of such fine fiber glass, preferably closely interwoven as noted above, it will be appreciated that but a thin encasement or wall of the plastic is required to produce a hose capable of sustaining extremely high bursting pressure. While a wide variety of resins may be employed, in the preferred operation polyvinyl type resins are utilized. These are applied in a manner more fully to be described so as to establish a coating or encasement on the tube of about 15,000th of an inch thick. This low wall thickness of the resin, coupled with the inherent flexibility of the glass fibers, thus insures the production of a hose which is as extremely light and strong as it is flexible. The wall thickness is of such a low order and the resin of sufficient flexibility such that the hose may be rolled up, looped, or otherwise conformed in the flattened condition to thus insure but a minimum of storage space. This, as will be appreciated, is a factor of considerable importance in large technical installations or for fire hose.

In order to encase a substantially flaccid tubing of fiber glass with a plastic material to form a tubing surfaced etxeriorly and interiorly with a plastic, it is necessary, as will be appreciated, to utilize a mandrel or its equivalent to retain the reinforcing fiber core in the tubular form during the application and setting or curing of the plastic. This is no particular problem when short lengths of hose are to be produced. However, it poses a major problem in this field of garden hose and similar tubings where the hose is first fabricated by a continuous method to produce hose lengths of the order of 2,000 feet. In the practice in this art, these are cut into 50 foot lengths and the end couplings or fittings are then attached. A production which would involve the use of a mandrel of such an extreme length is obviously out of the question.

Under the present invention continuous tubing of any desired length may be produced by invoking a novel concept. This, as will be further elucidated, involves the utilization of a relatively short, substantially vertically positioned floating mandrel over which the preformed fiber glass tube is drawn while the desired resinous surfacing is applied. This is readily achieved by the simple expedient of correlating the weight of the mandrel with the sliding friction of the fiber glass tube passing thereover such that the weight of the mandrel balances the friction of the moving tube. Inasmuch as the velocity with which one surface slides over another makes but little difference in the total friction, no particular limitations are imposed on the speed with which the tube can be passed over the mandrel.

In order to more fully explain the invention, there is shown in the accompanying drawings an illustrative type of mechanism which may be utilized to effectuate the novel method in which:

Fig. 1 is a diagrammatic elevational view of the equipment for carrying out the process.

Fig. 2 is an enlarged cross-section taken on line 2—2 of Fig. 1.

Fig. 3 is an enlarged cross-section taken on line 3—3 of Fig. 1.

Fig. 4 is an enlarged detailed cross-section of a modified form of the invention.

The apparatus shown in the drawing, as noted, is merely illustrative and typifies any equivalent assemblage of units which perform the same ultimate functions. As shown, the apparatus comprises essentially an unwinding reel 1 from which the preformed fiber glass tubing 2 is unwound, a resin applying zone 3 in which resin is applied to the fiber glass tubing while this is retained in the tubular shape by the mandrel 4. After passing through the resin applying zone the coated hollow tubular material is continuously passed through a resin drying or curing zone 5 and thence, after a predetermined period of travel, to the take-up reel 6. It will be observed that the process thus comprises passing preformed tubing of filamentary fiber glass through a resin applying zone and curing or drying the resin while maintaining the tube in a predetermined conformed shape.

Considering the process more in detail, the tubular fiber glass employed, if not already so treated, is first heat treated to remove the lubricant used in its fabrication so as to insure optimum wetting by the resin. The fiber glass tubing, as will be seen from an inspection of Figs. 2, is essentially flaccid and is passed over the guide roller 7 and idler rolls 8 and 8' in the form of a flattened tube and thence to the rollers 9 and 9'. The unwinding reel and one or both of the rollers 9 and 9' are preferably power driven and the rotational speed is so correlated that no buckling of the tube 2 occurs during its passage through the operation.

The flattened tube 2 is then passed upwardly over the internally positioned mandrel 4 and through the resin applying zone 3. It will be observed that the mandrel is of sufficient length so that it extends for a substantial distance past the resin drying zone so that the tube is maintained in tubular form while the applied resin is converted to the solid phase. In a simplified form of the invention, the resin which is applied is a thermoplastic resin dissolved in a suitable volatile solvent. After application of the resin solution, the solvent is evolved in a drying zone, as noted, so as to establish the solid phase resin encasement of the fiber tube in the desired conformed shape. Preferably, the cross-sectional shape is cylindrical, but obviously it may be of any other desired configuration, i. e., elliptical, and the like.

The resin applying zone may be of any desired type of construction. That shown comprises simply a container of any suitable size and shape, such as the frusto-conical type shown. The bottom 10 of the container may be in the shape of an inverted cone and preferably is provided with the sealing member 11, which latter may comprise a ring of felt, rubber, or other suitable material which bears uniformly against the fiber glass tube 2 in its passage through the resin applying zone. The member 11 thus serves as a seal to prevent undue leakage of the resin. Any excess resin which may leak past the seal accumulates in the drip pan 12 or similar unit. The upper end of the resin container 3 preferably is provided with a removable cover 13 formed with a central aperture conforming to the external diameter of the fiber glass tube. This cover, as will be noted, may be provided with the flexible doctor ring 14, fabricated of felt, rubber, flexible fiber, or the like, and is adapted to lightly contact the resin wetted tube to wipe off excess resin and may be adjusted, if desired, to impart a relatively smooth surface to the resin.

The resin solution in the container 3 may be drawn from any suitable source of supply, such as the make-up tank 15, and is passed to the container 3 through the line 16 either continuously or intermittently in amounts regulated by valve 17. When relatively viscous resin solutions are employed, a pump may obviously be inserted in line 16.

As noted previously, after the flexible tubing has been wetted and coated with the resin solution, it is passed in a continuous travel through a drying zone when the solvent vehicle is removed and the resin converted to solid phase while the tubular material is retained in conformed shape by the mandrel. This drying zone may be of any desired structure and is of a length sufficient to permit substantial evaporation and removal of the solvent vehicle. As shown, the drying zone may consist simply of the container 4 provided with apertures in the top and bottom through which the resin coated tube 24 passes. In the container the resin solvent is rapidly evolved as, for example, by means of air drawn in line 20 and forced by blower 21 through the line 22 into the upper section of the drying zone. The solvent vapor-air mixture, as shown, is withdrawn through line 23 for recovery of the solvent, if desired, or for disposal.

As will be observed from an inspection of the drawings, the mandrel 4 is retained against lateral movement but is freely movable or floating in the vertical direction. Any suitable means may be provided to prevent undue lateral play or whipping of the mandrel. This, as shown, may simply consist of one or more pairs of guide rollers 25 and 26 positioned above the drying zone and a corresponding pair of rollers 25' and 26' positioned below the resin solution applying zone. This is the way that the mandrel is supported against lateral movement anteriorly and posteriorly of the resin applying and curing zones. As shown in Fig. 3, the rollers 25 and 26 are mounted on shafts 27 and 28, respectively, which are journalled or mounted for rotation in the bracket supports 29 and 30. Rollers 25 and 26 may be similarly mounted. While but one pair of rollers is shown at each of the two positions, it will be appreciated that a series of such pairs may be utilized, the rollers of each pair being differentially positioned with respect to the circumference of the mandrel so that the mandrel is confined within close tolerances in the lateral direction. If desired, or whenever found necessary, rollers 25 and 26 or their equivalents may be continuously or intermittently dusted with suitable power material to obviate any tendency of the tacky resinous surface of the tube 24 to adhere to the rollers.

As intimated previously, the weight of the mandrel is adjusted so as to overcome and gravimetrically balance the tendency to its movement upward due to frictional contact with the tube 2. This, as shown, may be simply affixed by providing the mandrel with a receiving stud 32 or equivalent member which may be slotted or screw threaded to receive one or more of the weighted discs 33. The total weight of the mandrel may thus be adjusted so that it is correlated with the frictional traction exerted by the tube 2 to accurately balance this traction and thus retain the mandrel in a substantially fixed vertical position during the operation.

The mandrel may be fabricated of any suitable material such as solid or hollow tubes of ferrous or non-ferrous metals. The surface of the mandrel preferably is coated, electroplated, or otherwise formed with a surfacing which is not readily wetted with the particular plastic utilized in the operation. Thus the mandrel may comprise an alloy steel tube, such as stainless steel, the surface of which is well polished and preferably is electrolytically polished. The surface of the mandrel similarly may be formed of a suitable mercury amalgam which displays a low contact angle with respect to the glass fiber.

After passing through the resin drying zone a sufficient period or distance of travel of the coated tube 24 is established to permit sufficient drying or curing of the resin to a non-tacky solid. During such travel, the tube may be heated, subjected to forced air currents, coated with detackifying materials and the like. Thereafter the tube passes continuously over the guide roller 31 in a flattened shape and is convoluted on the take-up roll 6. It will be observed that this continuous operation is eminently simple. In starting up, an end of the fiber glass tubing is manually fed over the mandrel and passed over the take-up roll 6. The tubing 2 is then continuously passed through the system. It will be appreciated that simple preliminary facts and tests will establish the proper weight of a given mandrel for use with a particular fiber glass tubing and a particular resin solution.

It is to be understood that the broad concept of the invention involves the continuous production of a reinforced plastic tubing by utilizing a relatively short floating mandrel. Where the frictional traction of the tube is to be balanced gravimetrically, this may simply be accomplished by using a substantially vertically positioned mandrel of adjusted weight in the manner shown. However, the invention is not limited to the passage of a woven fiber tube in a vertical direction for treatment with resin nor is it limited to the concept of gravimetrically balancing the friction forces acting on the mandrel. This may be accomplished by other methods such as, for example, by electrical balancing. This latter may readily be accomplished as shown in Fig. 4, by establishing the anterior section of the mandrel, i. e., the section below the resin applying tank 3, as a core of a solenoid. The solenoid coil may be positioned below the resin applying solution tank 3 and encloses the lower section of the tube covered mandrel. By proper winding of the coil, as will be appreciated, the electricity flowing through the coil establishes a predetermined force on the mandrel balancing the frictional traction. With this type of solenoid or equivalent construction it will be appreciated that the mandrel may be positioned horizontally or vertically or at any intermediate angle.

It will be understood also that the same concept of the electrical balancing of a mandrel which is freely floating in the direction of travel of the fiber tube may be invoked in other specifically different types of treatment. For example, while for thin wall tubes it is preferable to use a resin solution to secure the desired ultimate resin coating, the fundamental principles of the invention may be utilized in producing thicker walled tubes, such, for example, as will be established by continuous extrusion methods. In such an operation a mandrel may be associated with a continuous extrusion machine such that the posterior section is within the head of the continuous extruder and the anterior section is elongated and associated with a plurality of circumferentially positioned guide rollers so chosen and positioned as to prevent vertical movement of the mandrel. The anterior end of the mandrel is associated with a solenoid coil, the end of the mandrel itself forming the solenoid core in the manner described. With this type of structure a preformed tube of fibrous material such as fiber glass may thus be continuously passed over the horizontally floating mandrel to receive a coating of extruded plastic and the mandrel during this operation may effectively be retained in a substantially constant position by the balancing force exerted by the solenoid.

When utilizing a preformed fiber glass fabricated of filaments of low denier excellent tubing may be produced with very thin resin coatings, which as noted, may be of the order of .015" in thickness. In the preferred operation of the invention, the polyvinyl plastics, particularly the polyvinyl esters, are especially recommended. These are employed in solvent solution together with suitable plasticizers, especially the non-migratory type to impart the desired ultimate flexibility to the composite tube. A polyvinyl ester such as the acetate, chloride and polyvinyl acetate-chloride present many characteristics which particularly recommend them for the described purposes. Since the tensile and impact strength as well as abrasion resistance increases generally as the molecular weight of the polymers such high polymers are recommended. The thermoplastic polyvinyl resins, as is known, are substantially tasteless, odorless, non-toxic and present excellent chemical and water resistance. Tubing fabricated with such resins are thus well suited for use not only as garden hose but also for employment in the food, beverage and many other industries. It will be appreciated that if desired the plastic may be applied to the fiber tube in the form of a hot melt or an emulsion with, of course, consequent modification of the subsequent curing or drying steps. As noted above, however, for relatively thin walled tubing the solution route is the recommended method of applying the plastic.

It is particularly to be observed at this point that the invention is by no means limited to the described particular thermoplastic resin encasement. A wide range of resins not only of the thermoplastic but also the thermosetting type may be utilized.

For example, the principles of the invention may be invoked to produce reinforced plastic tubing of the thermosetting type. In this operation the floating mandrel 4 either gravimetrically or electromagnetically balanced may be utilized during application and curing of the resin. In the use of the thermosetting type of materials the resin may be applied in fused or solution form and the curing zone through which the coated tube continuously passes may be provided at each end with air locks and the necessary temperature and pressure for curing applied by means of a heated liquid solution such as a paraffin oil. In other words, the curing zone comprises an autoclave into which the floating mandrel extends and over which the resin coated or impregnated tube continuously passes and is cured. The pressure within the autoclave is of course retained by means of the air seals in the well known manner. Thus well plasticized phenolic resins may be utilized in the described operation to produce excellent tubing of substantial flexibility.

It will thus be observed that the invention is of eminent utility. It provides a very simple and effective method for continuously producing reinforced resin tubing by utilizing a relatively short mandrel. This method is established and permitted by invoking the concept of utilizing a mandrel which is substantially freely floating in the direction of travel of the reinforcing fibrous tubular material and balancing the friction of the tube on the mandrel either gravimetrically or electrically so as to retain the mandrel in a substantially fixed position.

While preferred modifications of the invention have been described, it is to be understood that these are given didactically to illustrate the fundamental principles involved and not as limiting the useful scope of the invention to the particular illustrative embodiments.

I claim:

1. An apparatus for continuously producing reinforced plastic tubing which comprises a substantially vertically positioned elongated mandrel freely floating in the vertical direction, means to feed a preformed tube of woven fiber glass over the mandrel, means to apply a liquid phase plastic to the tube and to convert the liquid phase plastic to the solid phase while in contact with the mandrel.

2. An apparatus in accordance with claim 1 in which the mandrel is of such adjusted weight as to balance the frictional traction of the tube on the mandrel.

3. An apparatus for continuously producing high strength plastic tubing which comprises a substantially vertically positioned elongated mandrel freely floating in the vertical direction, means to prevent any substantial lateral movement of the mandrel, means to feed a preformed tube of woven fiber glass upwardly over the mandrel, means to apply a resinous material to the tube while in contact with the mandrel, the mandrel being of such adjusted weight as to gravimetrically balance the sliding friction of the tube on the mandrel.

4. An apparatus for producing reinforced plastic tubing which comprises an elongated tubular metallic mandrel mounted for free floating movement in the direction of its axis, means to pass a preformed tube of woven fiber filaments over the mandrel, means to apply resinous material to the tube while in contact with the mandrel and electromagnetic means operative on the mandrel and adapted to balance the frictional traction exerted by the tube on the mandrel.

5. An apparatus in accordance with claim 4 in which the electromagnetic means comprises a solenoid coil enclosing a section of the mandrel.

6. An apparatus in accordance with claim 5 in which the said electromagnetic means comprises a solenoid coil enclosing a section of the mandrel anterior to the resin applying means.

JOHN M. FENLIN.

REFERENCES CITED

The following references are of record in the file of this patent:

UNITED STATES PATENTS

| Number | Name | Date |
|---|---|---|
| 1,196,648 | Bleecker | Aug. 29, 1916 |
| 1,771,216 | Gossler | July 22, 1930 |
| 2,168,993 | Joseph | Aug. 8, 1939 |
| 2,311,613 | Slayter | Feb. 16, 1943 |
| 2,324,645 | Prehler | July 20, 1943 |
| 2,377,908 | Slaughter | June 12, 1945 |
| 2,399,338 | Ford | Apr. 30, 1946 |
| 2,414,125 | Rheinfrank | Jan. 14, 1947 |